April 21, 1925.
F. STREICH
1,534,617
DOUGH MOLDING MACHINE
Filed Oct. 2, 1922
3 Sheets-Sheet 1
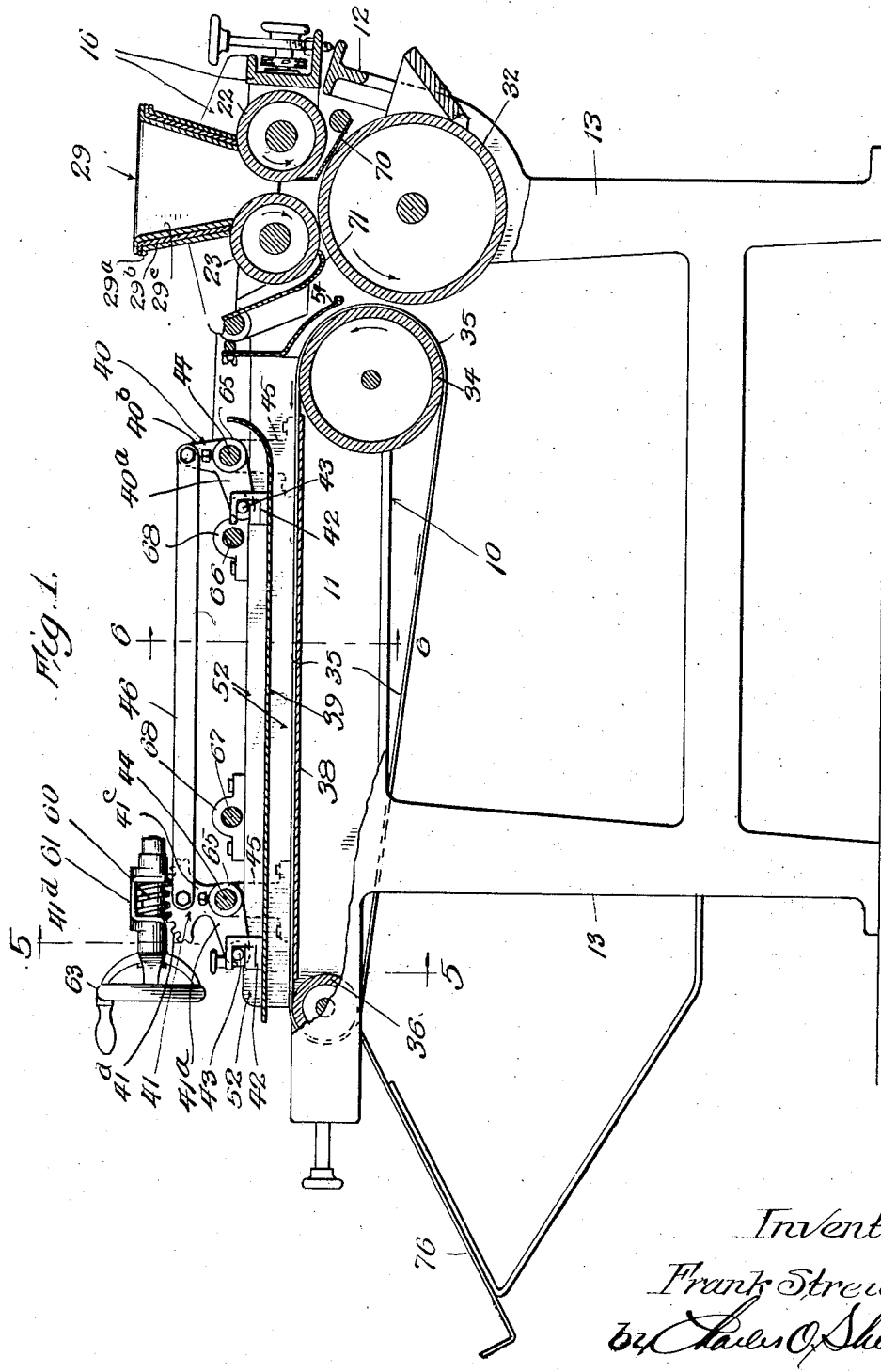
Inventor:
Frank Streich,
by Charles O. Shurvey
his Atty.

April 21, 1925.
F. STREICH
1,534,617
DOUGH MOLDING MACHINE
Filed Oct. 2, 1922
3 Sheets-Sheet 2
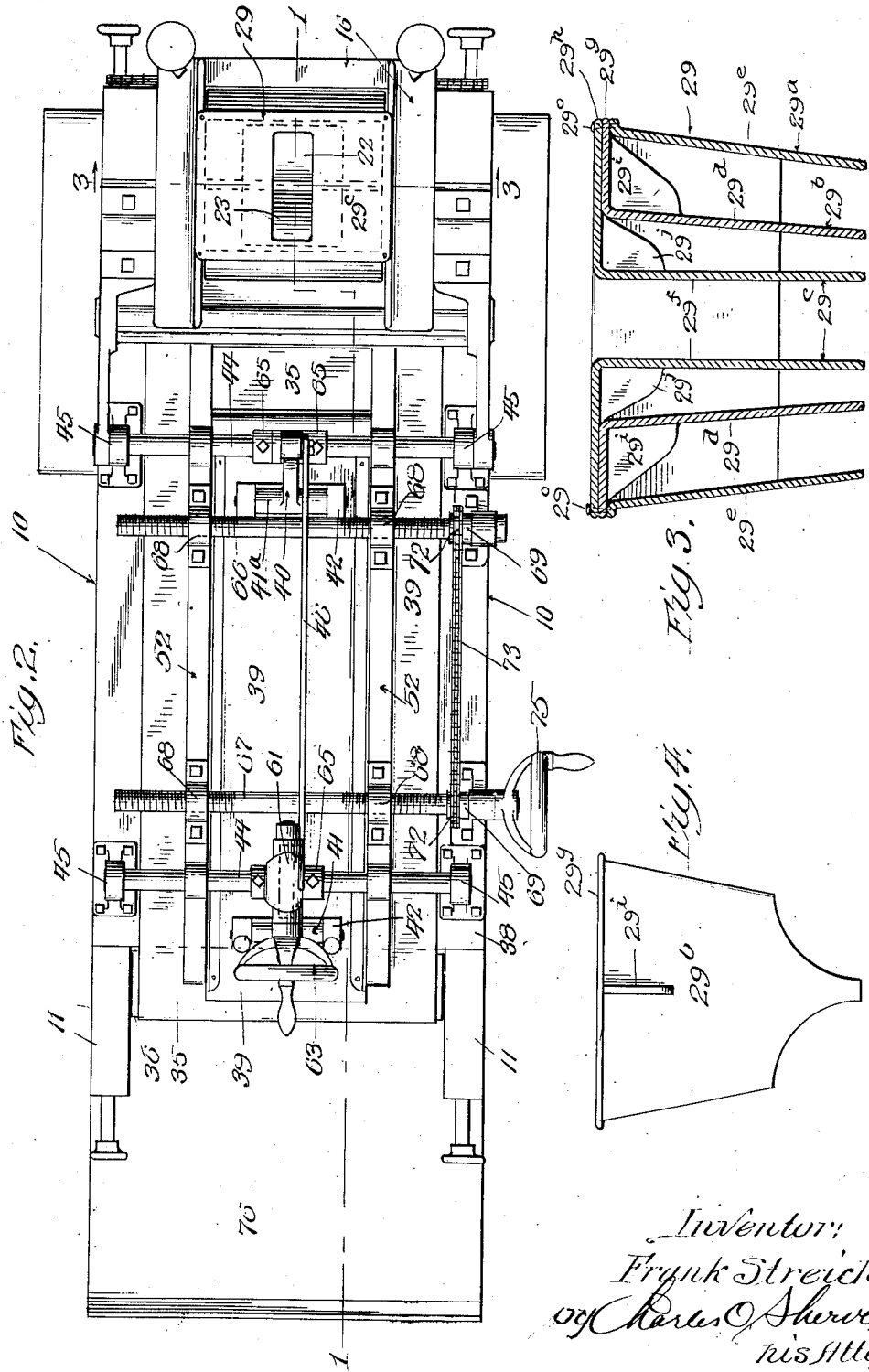

April 21, 1925.
F. STREICH
DOUGH MOLDING MACHINE
Filed Oct. 2, 1922
3 Sheets-Sheet 3
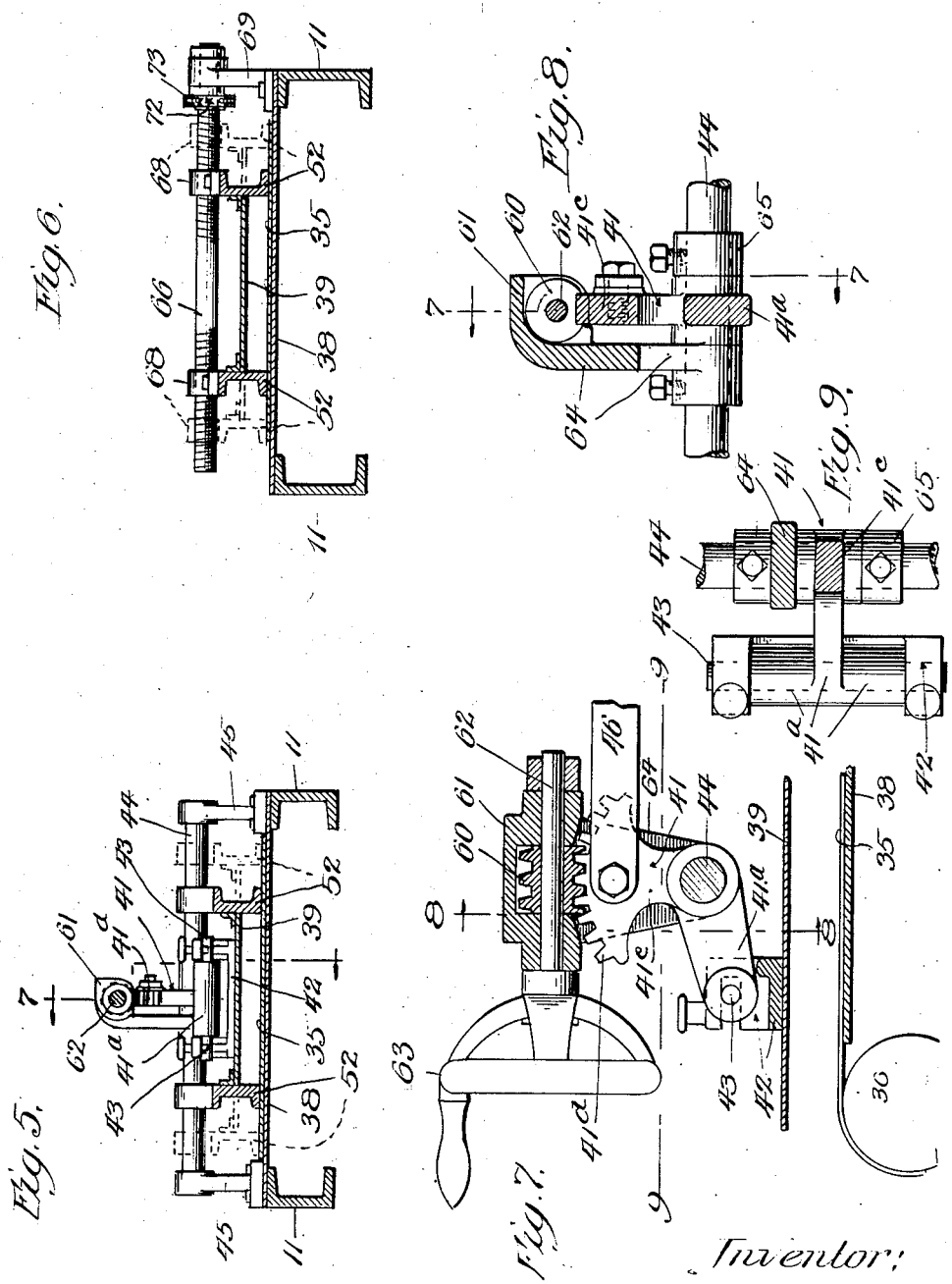

Patented Apr. 21, 1925.

1,534,617

UNITED STATES PATENT OFFICE.

FRANK STREICH, OF JOLIET, ILLINOIS, ASSIGNOR TO UNION MACHINERY COMPANY, OF JOLIET, ILLINOIS, A CORPORATION OF ILLINOIS.

DOUGH-MOLDING MACHINE.

Application filed October 2, 1922. Serial No. 591,753.

*To all whom it may concern:*

Be it known that I, FRANK STREICH, a citizen of the United States, and a resident of Joliet, Will County, and State of Illinois, have invented certain new and useful Improvements in Dough-Molding Machines, of which the following is declared to be a full, clear, and exact description.

This invention relates to dough molding machines and is in the nature of an improvement upon dough molding machine shown and described in my prior Patent No. 1,216,-512, dated February 20, 1917. The principal object of the present invention is to provide improved means for adjusting the pressure board and side boards of molding machines of this general type, and to provide an improved adjustable hopper in connection therewith, whereby the lumps of dough, which are fed into the machine, may be delivered centrally upon the belt or apron which carries the lumps underneath the pressure board. With these and other objects in view the invention consists in the several novel features hereinafter fully set forth and claimed.

The invention is clearly illustrated in the accompanying drawings, in which:

Fig. 1 is a view, partly in side elevation and partly in vertical longitudinal section, of a dough molding machine embodying a simple form of the present invention. The line of section being indicated at 1—1 in Fig. 2; Fig. 2 is a plan of the parts in Fig. 1; Fig. 3 is a detail, vertical, cross section of the hopper, taken on the line 3—3 of Fig. 2; Fig. 4 is a detail, side elevation of one of the hopper sections; Fig. 5 is a detail, vertical, cross section taken on the line 5—5 of Fig. 1; Fig. 6 is a detail, vertical, cross section taken on the line 6—6 of Fig. 1; Fig. 7 is a detail, vertical, longitudinal section taken on the line 7—7 of Figs. 5 and 8; Fig. 8 is a detail vertical, cross section taken on the line 8—8 of Fig. 7; and Fig. 9 is a detail, horizontal, section taken on the line 9—9 of Fig. 7.

Referring to said drawings, which illustrate one embodiment of the invention in connection with a dough molding machine constructed substantially in accordance with that shown and described in my prior patent above referred to, a main supporting frame 10 is provided for the mechanism, and said frame comprises horizontal side frame members 11, a cross frame member 12 and legs 13, 13. Supported upon said main frame is a tiltable frame 16, which is adjustably supported at one end upon the cross frame member 12, and said frame 16 supports a hopper 29, and the feed rolls 22, 23 located below the hopper. Mounted on the main frame below the feed rolls is a sheeting roll 32, and in front of the sheeting roll is a pulley 34, around which is trained a belt 35 that extends to the other end of the machine and is there trained on the second pulley 36. The feed rolls, sheeting rolls and pulley 34 are geared together to rotate in the directions indicated by the arrows thereon, by suitable gearing, as is clearly illustrated in my prior patent and requires no description so far as this specification is concerned. The belt 35 travels over a table 38 which is secured to the horizontal side frame members 11. The kneader 54 and scrapers 70, 71 are provided as in the machine in my prior patent.

The hopper 29, which forms part of the present invention comprises a plurality of hopper sections $29^a$, $29^b$, $29^c$ fitting one within the other, as clearly illustrated in Fig. 3. The several hopper sections are substantially rectangular in shape but the side walls $29^d$ of the intermediate hopper section $29^b$ are placed considerably closer together than the side walls $29^e$ of the outer hopper section $29^a$ while the side walls $29^f$ of the inner section are placed considerably closer together than the side walls of the intermediate hopper section $29^b$. The intermediate hopper section $29^b$ has a horizontal flange $29^g$ which extends to and rests upon the top marginal edge of the outer section $29^a$, and the inner hopper section $29^c$ has a horizontal flange $29^h$ that rests on the hopper flange $29^g$ of the intermediate hopper section. Each hopper section has a continuous passageway extending from top to bottom, the size of which is governed by its side walls and end walls. For the purpose of strengthening the intermediate and inner hopper sections, and for the purpose of locating them in place, they are provided with ribs $29^i$, $29^j$ which extend to and engage the side walls of the surrounding hopper sections. The intermediate and inner hopper sections are held against accidental displacement by pins $29^o$ placed in holes at the corners of the flanges of the several hopper sections. When all of the hopper sections are in place, as illustrated, the passageway through the hopper is governed by the inner hopper section, which forms a comparatively narrow passage through the hopper, and it is intended for use in this manner whenever small lumps of dough are to be operated upon by the molder. To accommodate the hopper to larger lumps of dough, the inner hopper section is removed, thereby leaving the intermediate one (which has a larger passageway to accommodate the larger lumps) in place and whenever still larger lumps of dough (up to the maximum size) are run through the machine, both the inner and intermediate hoppers are removed, leaving the outer one which contains the largest passageway.

Above the belt or apron 35 are the pressure board 39 and side boards 52, which are removably supported by levers, as in molding machine of my prior patent. The machine is furnished with several pressure boards similarly constructed but of different widths so as to take care of the different sizes of leaves. According to the present invention, the pressure board is supported by two levers 40, 41 which are rockably held upon rods 44, stationarily secured in standards 45, that extend up from the horizontal frame members 11. The arm 40ª, 41ª of the levers 40, 41 have pins 43 which engage in notches of brackets 42 that are secured to the mold board 39. The other arms 40ᵇ, 41ᶜ of the levers 40, 41 are connected together by a link 46 to provide a parallel motion for said levers 40, 41 whereby when one of them is rocked, the pressure board is moved up and down but maintained parallel with the belt or apron 35.

The arm 41ᶜ of the lever 41 is formed on its upper end with a worm gear segment 41ᵈ which meshes with a worm pinion 60 contained in a housing 61, and fast on a shaft 62, journaled in bearing apertures formed in said housing 61. Upon the outer end of the shaft 62 is a hand wheel 63 by means of which the shaft 62 and pinion 60 may be turned to thereby rock the worm gear segment 41ᵈ and its lever 41. It will be understood that by rocking said lever 41, the lever 40 is correspondingly rocked and the pressure board is thereby raised or lowered, depending upon the direction in which the worm gear segment is moved. The housing 61 is formed upon the upper end of a bracket 64 which is secured to the stationary cross rod 44. The collar 65, adjacent the levers 40, 41, are secured upon the rods 44 and hold the levers 40, 41 in place thereon.

At the sides of the pressure board 39 are the side boards 52 which, together with the pressure board 39 and belt 35, form the passageway through which the dough is moved under pressure, and moulded into form. The side boards 52 are provided with adjustment mechanism for moving them toward or away from each other to decrease or increase the size of the passage way between them and, as shown, said adjustment means comprises right and left threaded rods 66, 67, threaded in brackets 68 that are secured to the side boards 52. The right and left threaded rods 66, 67 extend through stationarily supported brackets 69 at one end, where they are unprovided with threads and are held therein against endwise movement. The two rods 66, 67 are connected to rotate in unison, as for instance, by a sprocket chain 73 trained around sprocket wheels 72, fast on the rods 66, 67, and a hand wheel 75 is secured upon the end of the rod 67 whereby the rods may be turned to adjust the side boards. It will be understood that when a wider pressure board is to be used than the one shown in the drawing, the present pressure board is detached from the levers 40, 41, the side boards 52 moved apart, the wider side pressure board put in place upon the levers 40, 41 and side boards moved up against it.

The operation of the machine is well understood and requires no detailed description so far as this specification is concerned. Briefly, the lumps of dough are fed into the hopper, pass between the feed rolls 22, 23, then between the feed roll 23 and sheeting roll 32, where they are sheeted, after which they pass through the crotch between the sheeting roll 32, and pulley 34, where they are curled up and are carried forward by the belt 35 underneath the pressure board 39, where they are moulded into form and are discharged upon a table 76. The size of the passage in the hopper and the size of the passageway under the pressure board, are regulated to suit the size of the lumps of dough which are to be operated upon by the machine. By using the proper sized hopper section, the lumps are delivered centrally of the belt or apron 35, and by properly adjusting the pressure board 39 and side boards 52, the loaf is finally moulded into proper form.

More or less variation as to the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. In a dough molding machine, the combination with a pair of feed rolls, a feed belt, mould board and side boards, of a hopper above said feed rolls, comprising a plurality of sections, nested one within the other, the passageways through said sections decreasing progressively toward the innermost one, and all of said passage ways being centrally located with respect to said feed belt.

2. In a dough molding machine, the combination with a pair of feed rolls, a feed belt and adjustable mould board and side boards, of a hopper above said feed rolls and comprising a plurality of hopper sections nested one within the other, the passageways through said sections decreasing progressively toward the innermost one, and the inner sections having flanges covering the passageways through the surrounding sections.

3. In a dough molding machine, the combination with a pair of feed rolls, a feed belt and adjustable mould board and side boards, of a hopper above said feed rolls and comprising a plurality of hopper sections nested one within the other, the passageways through said sections decreasing progressively toward the innermost one, and the inner sections having flanges covering the passageways through the surrounding sections and having, also, ribs engaging the walls of surrounding sections to locate the sections, one within the other.

4. In a dough molding machine, the combination of a mould board, a pair of bell crank levers upon which said mould board is secured, parallel movement means connecting said levers, a worm gear segment formed on one of the said levers, a worm pinion meshing with said worm gear segment, means for rotating the worm pinion and a stationary support for said pinion.

5. In a dough molding machine, the combination of a mould board, a pair of bell crank levers upon which said mould board is removably secured, a link connecting said levers, a worm gear segment formed on one of the said levers, a worm pinion meshing with said worm gear segment, means for rotating the worm pinion and a stationary support for said pinion.

6. In a dough molding machine, the combination of a mould board, two stationarily supported cross rods thereabove, two bell crank levers rotatively mounted on said cross rods, said mould board being removably secured to said levers, a worm gear segment formed on one of said levers, a worm pinion meshing with said worm gear segment, a support in which said worm pinion is rotatably mounted, said support being rigidly secured to one of said cross rods, and means by which said worm pinion is rotated.

7. In a dough molding machine, the combination of a supporting frame, a feed belt, a mould board, transverse rods supported by said frame, two side boards adjustably supported by said rods, two right and left threaded rods threaded in brackets on said side boards, means for holding said rods against endwise movement, and means for turning said rods in unison.

FRANK STREICH.